(12) United States Patent
Moldenhauer

(10) Patent No.: US 8,963,543 B2
(45) Date of Patent: Feb. 24, 2015

(54) ANGLE SENSOR FOR SENSING ANGULAR POSITION OF A ROTATABLE SHAFT

(71) Applicant: Leopold Kostal GmbH and Co. KG, Luedenscheid (DE)

(72) Inventor: Knut Moldenhauer, Hagen (DE)

(73) Assignee: Leopold Kostal GmbH & Co. KG, Luedenscheid (DE)

( * ) Notice: Subject to any disclaimer, the term of this patent is extended or adjusted under 35 U.S.C. 154(b) by 294 days.

(21) Appl. No.: 13/691,918

(22) Filed: Dec. 3, 2012

(65) Prior Publication Data

US 2013/0093415 A1  Apr. 18, 2013

Related U.S. Application Data

(63) Continuation of application No. PCT/EP2011/060366, filed on Jun. 21, 2011.

(30) Foreign Application Priority Data

Jun. 23, 2010 (DE) .......................... 10 2010 024 782

(51) Int. Cl.

| | |
|---|---|
| G01B 7/30 | (2006.01) |
| G01P 3/00 | (2006.01) |
| B62D 15/02 | (2006.01) |
| F16C 27/04 | (2006.01) |
| G01D 5/244 | (2006.01) |
| F16H 1/20 | (2006.01) |
| F16H 57/12 | (2006.01) |

(52) U.S. Cl.
CPC .............. *G01P 3/00* (2013.01); *B62D 15/0215* (2013.01); *F16C 27/04* (2013.01); *G01D 5/24442* (2013.01); *F16H 1/20* (2013.01); *F16H 2057/127* (2013.01)
USPC ............... 324/207.25; 324/207.2; 324/207.21

(58) Field of Classification Search
USPC ............................. 324/207.2, 207.21, 207.25
See application file for complete search history.

(56) References Cited

U.S. PATENT DOCUMENTS

| | | | |
|---|---|---|---|
| 6,341,426 B1 * | 1/2002 | Okumura ....................... | 33/1 PT |
| 6,552,533 B2 | 4/2003 | Schoedlbauer et al. | |
| 6,720,762 B2 * | 4/2004 | Okumura ................. | 324/207.21 |

(Continued)

FOREIGN PATENT DOCUMENTS

| | | |
|---|---|---|
| DE | 4005181 C1 | 10/1991 |
| DE | 19900330 A1 | 7/1999 |

(Continued)

OTHER PUBLICATIONS

European Patent Office, International Search Report for corresponding PCT/EP2011/060366 mailed Apr. 27, 2012.

*Primary Examiner* — Jay Patidar
(74) *Attorney, Agent, or Firm* — Brooks Kushman P.C.

(57) ABSTRACT

An angle sensor for sensing angular position of a rotatable shaft includes a drive gear, a measuring gear, and a sensor housing. The drive gear is connected to the shaft. The measuring gear is driven by the drive gear. The angular position of the shaft can be determined from an angular position of the measuring gear. The sensor housing has a bearing for the drive gear. The drive gear and the measuring gear are rotationally mounted about respective axes of rotation in the sensor housing with the drive gear being inside the bearing. The drive gear is forcibly pressed into a radial position inside the bearing by at least one spring.

20 Claims, 2 Drawing Sheets

(56) References Cited

U.S. PATENT DOCUMENTS

| | | | |
|---|---|---|---|
| 7,382,121 B2 | 6/2008 | Shiraga et al. | |
| 7,436,174 B2 * | 10/2008 | Shiraga et al. | 324/207.25 |
| 7,637,020 B2 | 12/2009 | Maier et al. | |
| 2003/0056583 A1 | 3/2003 | Schodlbauer et al. | |
| 2007/0090830 A1 | 4/2007 | Shiraga et al. | |

FOREIGN PATENT DOCUMENTS

| | | |
|---|---|---|
| DE | 19962241 A1 | 7/2001 |
| EP | 1132716 A1 | 9/2001 |
| EP | 1777484 A2 | 4/2007 |

* cited by examiner

ANGLE SENSOR FOR SENSING ANGULAR POSITION OF A ROTATABLE SHAFT

CROSS-REFERENCE TO RELATED APPLICATIONS

This application is a continuation of International Application No. PCT/EP2011/060366, published in German, with an International filing date of Jun. 21, 2011, which claims priority to DE 10 2010 024 782.0, filed Jun. 23, 2010; the disclosures of which are incorporated in their entirety by reference herein.

TECHNICAL FIELD

The present invention relates to an angle sensor for sensing the rotary position of a rotatable shaft in which the angle sensor has a drive gear connected to the shaft in a torque transmitting manner and a measuring gear(s) driven by the drive gear as the shaft rotates, the drive gear and the measuring gear(s) are mounted in a sensor housing, and the angular position of the rotatable shaft can be sensed from the angular position of the measuring gear(s).

BACKGROUND

DE 199 00 330 A1 (corresponding to U.S. Pat. No. 6,341,426) describes such an angle sensor for detecting the angular position of a rotatable shaft. The angle sensor includes a drive gear and one measuring gear. The drive gear is connected in a torque transmitting manner with the shaft. The measuring gear from which the angular position of the shaft is to be sensed is driven by the drive gear as the shaft rotates. The drive gear and the measuring gear are mounted in a sensor housing on axes that are parallel to one another.

The precision of measurement of such angle sensors depends on the precision of the mutual play of the teeth of the drive and measuring gear(s). Shape and position tolerances of the participating components give rise to a certain amount of play between the gears. This play particularly affects the reversal of the direction of rotation by leading to a hysteresis error.

EP 1 132 716 A1 (corresponding to U.S. Pat. No. 6,552,533) also describes an angle sensor for detecting the angular position of a rotatable shaft. The angle sensor includes a drive gear and two measuring gears. The drive gear is connected in a torque transmitting manner with the shaft. The measuring gears are individually driven by the drive gear as the shaft rotates. The measuring gears respectively include permanent magnets which are assigned with respective rotational position sensors such as Hall sensors and potentiometers through which the angular position of the shaft is detected.

The measuring gears are designed with different spring-loaded bearing elements. This design prevents the hysteresis error caused by play between the drive gear and the measuring gears. The spring-loaded bearing elements are coupled free of play to the drive gear, which is connected to the shaft rigidly. Using this type of coupling, static and/or dynamic deviations of the axis of rotation of the shaft from its ideal position can be compensated. A tradeoff is made in order to achieve this. The tradeoff is that the axes of rotation of the measuring gears deviate statically and/or dynamically from their ideal positions. This can give rise to non-insignificant measurement errors when a magnet of a measuring gear rotates about an anomalous axis with respect to the assigned sensor instead of about the axis of rotation provided or when an additional relative motion of the magnet takes place with respect to the assigned sensor instead of the intended rotational motion about the axis of rotation provided.

SUMMARY

An object of the present invention includes an angle sensor for sensing the angular position of a rotatable shaft in which compared with the above-noted background art the play between the drive gear and the measuring gear(s) can be significantly reduced, and thus the resulting hysteresis error can be significantly diminished, without having to accept the disadvantage that the axis of rotation of each measuring gear cannot be fixed with respect to the assigned sensor.

In carrying out at least one of the above and other objects, the present invention provides an angle sensor for sensing angular position of a rotatable shaft. The angle sensor includes a drive gear, a measuring gear, and a sensor housing. The drive gear is connected to the shaft. The measuring gear is driven by the drive gear. The angular position of the shaft can be determined from an angular position of the measuring gear. The sensor housing has a bearing for the drive gear. The drive gear and the measuring gear are rotationally mounted about respective axes of rotation in the sensor housing with the drive gear being inside the bearing. The drive gear is forcibly pressed into a radial position inside the bearing by at least one spring.

Embodiments of the present invention are directed to an angle sensor for sensing the angular (i.e., rotary, rotational, etc.) position of a rotatable shaft. The angle sensor includes a drive gear (e.g., a drive wheel) and at least one measuring gear (e.g., at least one measuring wheel). The drive gear is connected to the shaft such that the drive gear rotates as the shaft rotates in a torque-transmitting manner. The measuring gear(s) is directly driven by the drive gear such that the measuring gear(s) rotate as the shaft rotates. The drive gear and the measuring gear(s) are mounted in a sensor housing. The angular position of the shaft can be determined from the angular position(s) of the measuring gear(s). At least one resilient element (i.e., at least one elastic spring) exerts a force onto the drive gear thereby forcing the drive gear into a defined radial position in a bearing for the drive gear.

The drive gear of an angle sensor in accordance with embodiments of the present invention is forcibly pressed into a defined radial position inside its bearing by at least one elastic spring. Such a configuration enables the angle sensor to achieve a relative significant reduction of play between the drive gear and the measuring gear(s), and thus a relative significant reduction of the resulting hysteresis error, without having to accept that the axis of rotation of each measuring gear cannot be fixed with respect to its assigned sensor.

As the drive fear is forced by an elastic spring(s) into a defined radial position in its bearing it is possible to fix the axis of rotation of the drive gear with respect to the housing of the angle sensor independent of its rotational position so that the axis of rotation of each measuring gear can be determined in relation to them. The force exerted by the elastic spring(s) on the drive gear is supported by the opposing wall of the bearing. As such, no force is exerted on the measuring gears, which could lead to noise production.

In an embodiment, the bearing for the drive gear is formed by an annular-shaped recess in the sensor housing and each elastic spring is accommodated radially opposite in the annular recess of the sensor housing.

In an embodiment, two sheet metal spring strips, used as elastic springs, are held respectively in axial slots that are present in the annular recess in the sensor housing and press against the outer side on a support element of the drive gear. The support element is integrally molded on the drive gear.

In an embodiment, the angle sensor further includes a transmission element. The transmission element is accommodated between the rotatable shaft and the drive gear. Static and/or dynamic deviations of the axis of rotation of the shaft are provided both with respect to its radial position in relation to the axis of rotation of the drive gear as well as to compensate with respect to a possible deviation from the parallel alignment by the transmission element. The transmission element has elastic spring properties and is maintained under elastic tension between the shaft and the drive gear. As such, a play-free contact of the drive gear with the shaft acts in each rotational position of the shaft through the transmission element.

The above features, and other features and advantages of the present invention are readily apparent from the following detailed description thereof when taken in connection with the accompanying drawings. It is understood that the features stated above and to be explained below may be used not only in the particular stated combination, but also in other combinations or alone without departing from the scope of the present invention.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
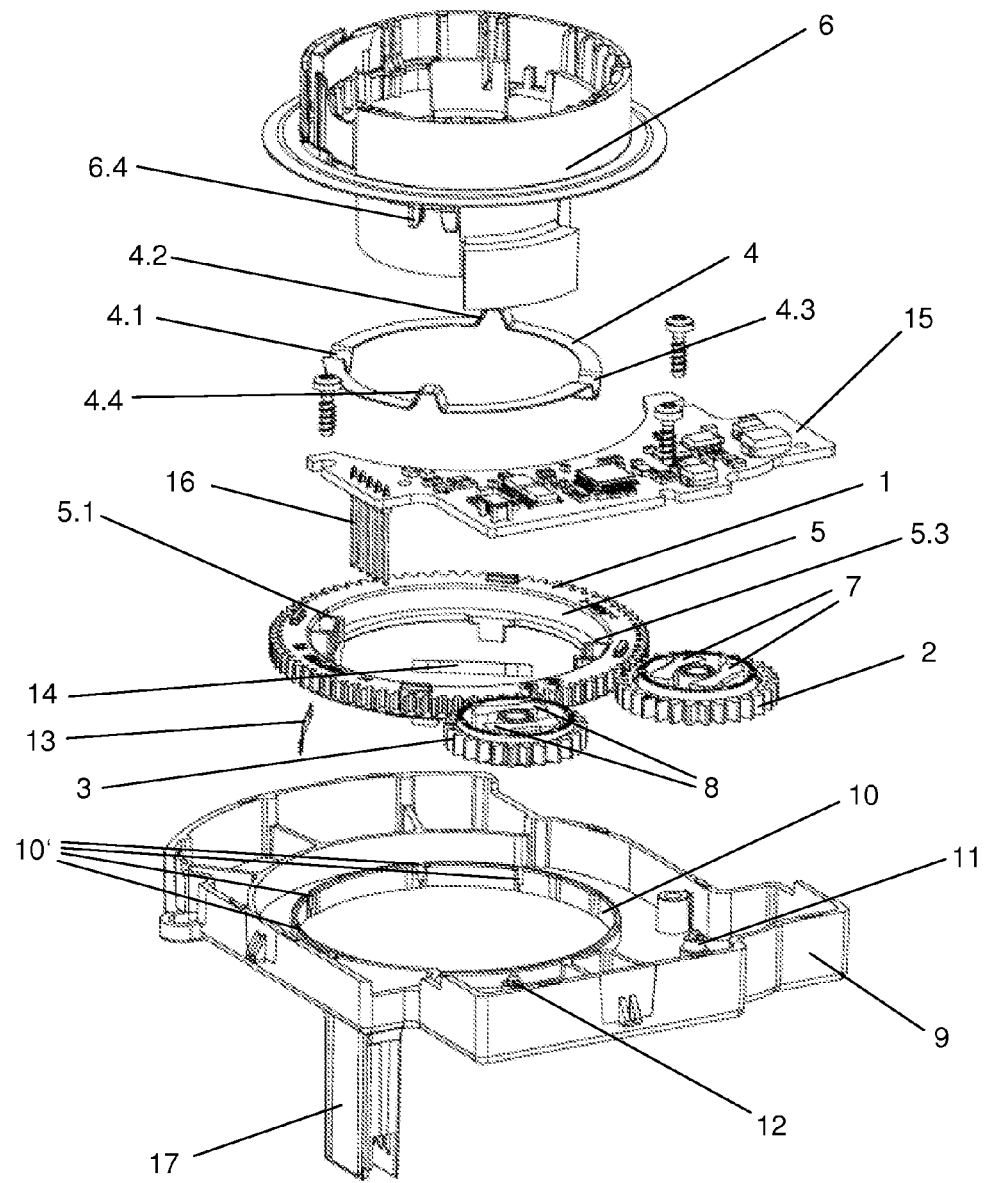
FIG. 1 illustrates an angle sensor in accordance with an embodiment of the present invention.
Figure 2:
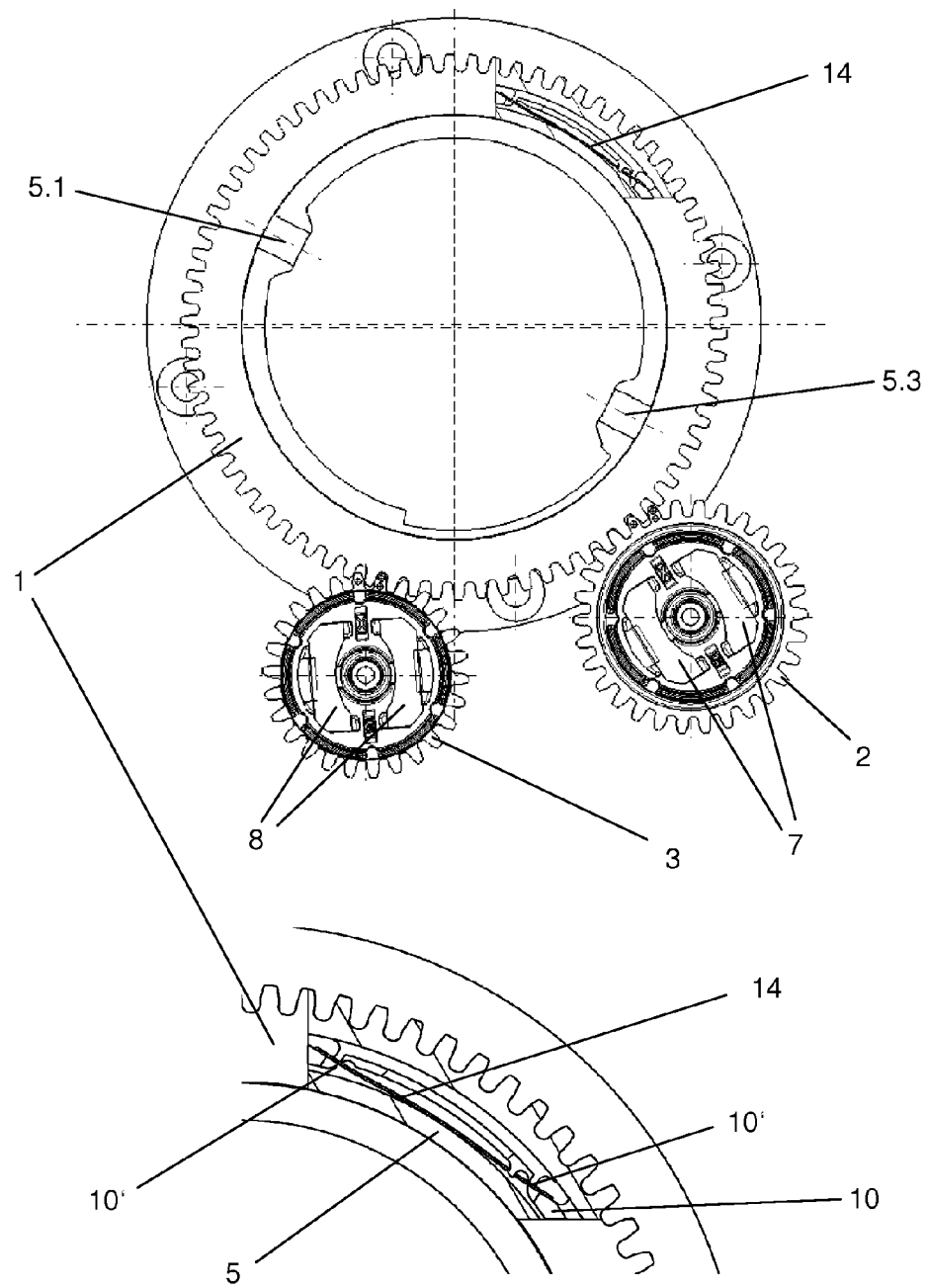
FIG. 2 illustrates (i) a top view of the drive gear and the measuring gears of the angle sensor shown in FIG. 1 and (ii) a detailed enlargement view of a cutout through the drive gear of the angle sensor shown in FIG. 1.

Referring now to FIGS. 1 and 2, an angle sensor in accordance with an embodiment of the present invention will be described. The angle sensor is configured to sense the angular position of a rotatable shaft. For instance, in this embodiment, the angle sensor is a magnetic steering angle sensor for a vehicle and in this case the rotatable shaft for is the steering spindle of the vehicle.

The angle sensor includes a drive gear 1 and at least one measuring gear 2, 3. In this embodiment, the angle sensor includes two measuring gears 2, 3. Drive gear 1 is to be connected to the shaft in a torque transmitting manner such that drive gear 1 rotates and transmits torque as the shaft rotates. Measuring gears 2, 3 individually engage with drive gear 1 such that measuring gears 2, 3 are driven by the drive gear as the drive gear rotates with the shaft. The angular position of the shaft can be sensed from the angular position of measuring gears 2, 3.

The angle sensor further includes a sensor housing 9. Sensor housing 9 includes an oversized annular recess 10. Annular recess 10 forms a bearing in sensor housing 9 for drive gear 1. Drive gear 1 is integrally molded on the outside of a support element 5. Drive gear 1 is rotationally-mounted in sensor housing 9 on an axis of rotation. For this purpose, support element 5 is held by a short skirt that extends below drive gear 1 in annular recess 10. Measuring gears 2, 3 are rotationally-mounted on respective axes of rotation 11, 12 in sensor housing 9. Axes of rotation 11, 12 of measuring gears 2, 3 are oriented parallel to the axis of rotation of drive gear 1. Measuring gears 2, 3 mesh with drive gear 1 in sensor housing 9.

Resilient elements such as elastic springs 13, 14 are accommodated in annular recess 10 of sensor housing 9. Springs 13, 14 respectively lie radially opposite rotational axes of rotation 11, 12 of measuring gears 2, 3. Springs 13, 14, in this embodiment, are made of sheet metal spring strips. Springs 13, 14 are held respectively in two axial slots 10' of annular recess 10. Springs 13, 14, as the elastic elements, press against the outside of the short skirt of support element 5 that extends below drive gear 1. As a result, drive gear 1 is forced into springs 13, 14 lying opposite axes of rotation 11, 12 of measuring gears 2, 3 for the radial position lying near measuring gears 2, 3 inside of the bearing for drive gear 1.

This is clarified by the top view of drive gear 1 and measuring gears 2, 3 of the angle sensor and the detailed enlargement view of a cutout through drive gear 1 depicted in FIG. 2. Spring 14 shown in both views of FIG. 2 is held in the neighborhood of its ends in axial slots 10' in annular recess 10 of sensor housing 9. The inner wall of annular recess 10 is displaced somewhat outwardly in the region between these retaining points so that a certain amount of outward play is present for spring 14. In its middle region, spring 14 lies on the outer side of the short skirt of support element 5 connected with drive gear 1 and presses drive gear 1 in the direction of the axis of rotation of drive gear 1. Spring 13 is held in the same manner in annular recess 10 of sensor housing 9 and presses drive gear 1 in the direction of the axis of rotation of drive gear 1. The overall effect of springs 13, 14 is that the outer side of the short skirt of support element 5 applies a force to the side that lies radially opposite, approximately in the middle between springs 13, 14 of the inner wall of annular recess 10, and thus in a region lying between the connecting lines from the rotational axis of drive gear 1 to rotational axes 11, 12 of measuring gears 2, 3.

Measuring gears 2, 3 are smaller than drive gear 1 and have different numbers of teeth. Consequently, the angular position of drive gear 1, and thus the angular position of the shaft, can be determined unambiguously over a plurality of revolutions from the respective angular positions of measuring gears 2, 3 using a beat frequency angle in a manner known, for example, from DE 10 2006 006 359 A1 (corresponding to U.S. Pat. No. 7,637,020).

Acquisition of the angular position of measuring gears 2, 3 to obtain the rotational position of the shaft is accomplished in this case by magnetic field sensors. The magnetic field sensors are arranged on a printed circuit board 15 positioned adjacent sensor housing 9. The magnetic field sensors respectively detect magnetic fields produced by permanent magnets 7, 8 respectively arranged in measuring gears 2, 3. Additional electronic components along with the magnetic field sensors are located on PCB 15.

The magnetic field sensors can for example include Hall sensors and magneto-resistive sensors, along with additional electronic measurement and evaluation components of the angle sensor. An exact positioning of the magnetic field sensors with respect to measuring gears 2, 3, and thus permanent magnets 7, 8, is accomplished by two holes. The two holes, which are obscured in PCB 15, penetrate into the continuation of rotational axes 11, 12 that hold measuring gears 2, 3, as well as by a screw connection of PCB 15 with sensor housing 9 in the thus defined position. In order to make contact with other control devices, contact pins 16 are pressed into PCB 15. Contact pins 16 are used in forming a plug-connector inside a connector shroud 17. Connector shroud 17 is integrally molded on sensor housing 9. As such, contact pins 16 are passed through sensor housing 9.

The angle sensor further includes a transmission element. A torque transmitting connection of driving gear 1 with the rotatable shaft (e.g., the steering spindle) takes place through transmission element 4. Transmission element 4 in this embodiment is an essentially circular body that is designed as a spring and is made of spring sheet metal. Transmission element 4 has four axial bearing extensions 4.1, 4.2, 4.3, 4.4. Bearing extensions 4.1, 4.2, 4.3, 4.4 respectively form two pairs arranged opposite to one another with respect to the circumference of transmission element 4. Bearing extensions 4.1, 4.3 of the first pair point axially downwardly. Bearing extensions 4.2, 4.4 of the second pair point axially upwardly.

Drive gear 1 includes a pair of bearing sets 5.1, 5.3. Bearing seats 5.1, 5.3 of drive gear 1 are integrally molded on support element 5 in this embodiment. The first pair of bearing extensions 4.1, 4.3 of transmission element 4 is engaged with corresponding bearing seats 5.1, 5.3 of drive gear 1.

A bearing ring 6 is rigidly connected with the rotatable shaft. Bearing ring 6 includes a pair of shaft-side bearing seats 6.4 (only one shown). Bearing seats 6.4 of bearing ring 6 are formed integrally with bearing ring 6. The second pair of bearing extensions 4.2, 4.4 is engaged with corresponding bearing seats 6.4 of bearing ring 6.

Ideally, the axes of rotation of the rotatable shaft and drive gear 1 would be identical, i.e., they would lie along a straight line spatially. Under actual assembly conditions, however, non-insignificant tolerances play a role. This concerns the location of these axes with respect to one another in a fixed rotational position. Thus, static tolerances play a role. Particularly in the case of a steering angle sensor, in which the rotatable shaft is formed by the steering spindle of a vehicle, dynamic tolerances also have to be taken into consideration since a certain amount of play cannot be eliminated in steering spindles.

Transmission element 4 compensates for deviations of the axis of rotation of the shaft from the axis of rotation of drive gear 1. Such deviations include both deviations in the radial location of the axes and deviations from parallel alignment. For this reason, transmission element 4 is held under axial pretension between bearing ring 6 and drive gear 1. The force that acts through bearing seats 5.1, 5.3 of drive gear 1 on transmission element 4 is directed upwardly. The force that acts through bearing seats 6.4 of bearing ring 6 on transmission element 4 is directed downwardly. The flat regions of the annular body of transmission element 4 between bearing extensions 4.1, 4.2, 4.3, 4.4 are thereby subjected to bending. Due to the elastic spring properties, counterforces caused by bending result in which bearing extensions 4.1, 4.2, 4.3, 4.4 press against bearing seats 5.1, 6.4, 5.3, 6.4 of drive gear 1 and bearing ring 6 so that a coupling that is free of play is present between bearing extensions 4.1, 4.2, 4.3, 4.4 and bearing seats 5.1, 6.4, 5.3, 6.4. Consequently, a coupling that is free of play is also present between bearing ring 6 and drive gear 1, which are connected with the shaft.

The steering angle sensor in accordance with an embodiment of the present invention can function as a sub-component group of a steering column module of a vehicle. Such a steering column module may also include the steering column switch for actuating the blinker- and/or wiper functions of the vehicle as additional subcomponent groups. The switch may include a coil spring cartridge in which a ribbon cable is mounted for transmitting energy and/or signals between the steering wheel and the steering column in coils inside an annular cavity of a housing that concentrically surrounds its longitudinal axis.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An angle sensor for sensing angular position of a rotatable shaft, the angle sensor comprising:
   a drive gear connected to the shaft;
   a measuring gear driven by the drive gear, wherein the angular position of the shaft is determined from an angular position of the measuring gear;
   a sensor housing having a bearing for the drive gear;
   wherein the drive gear and the measuring gear are rotationally mounted about respective axes of rotation in the sensor housing with the drive gear being rotationally movable along the bearing and the axis of rotation of the drive gear being radially inward from the bearing; and
   at least one spring arranged between the bearing and a portion of the drive gear to forcibly press the drive gear radially inward from the bearing toward the axis of rotation of the drive gear.

2. The angle sensor of claim 1 wherein:
   the bearing for the drive gear is formed by an annular-shaped recess of the sensor housing.

3. The angle sensor of claim 2 wherein:
   one of the at least one spring is accommodated radially opposite the measuring gear in the annular-shaped recess of the sensor housing.

4. The angle sensor of claim 1 wherein:
   the at least one spring includes two springs.

5. The angle sensor of claim 4 wherein:
   the springs are sheet metal spring strips.

6. The angle sensor of claim 4 wherein:
   each spring is held respectively in two axial slots of the annular-shaped recess of the sensor housing.

7. The angle sensor of claim 1 wherein:
   the portion of the drive gear includes a support element connected to the drive gear.

8. The angle sensor of claim 1 further comprising:
   a transmission element, wherein the transmission element connects the drive gear to the shaft and compensates static and dynamic deviations of an axis of rotation of the shaft from the axis of rotation of the drive gear.

9. The angle sensor of claim 8 wherein:
   the transmission element has elastic spring properties and is between the shaft and the drive gear under elastic pretension.

10. The angle sensor of claim 8 wherein:
    the transmission element is an annular body having a plurality of axial-extending bearing extensions;
    wherein the drive gear includes a bearing seat;
    wherein a bearing extension of the transmission element engages with the bearing seat of the drive gear.

11. The angle sensor of claim 10 further comprising:
    a bearing ring, wherein the bearing ring is connected to the shaft and includes two bearing seats;
    wherein another bearing extension of the transmission element engages with the bearing seat of the bearing ring.

12. The angle sensor of claim 8 wherein:
the transmission element is an annular body having four axial-extending bearing extensions, wherein the bearing extensions are arranged at respective positions along the circumference of the annular body such that each bearing extension lies opposite to another bearing extension;
wherein the drive gear includes two bearing seats;
wherein two of the bearing extensions of the transmission element lying opposite to one another engage respectively with the two bearing seats of the drive gear.

13. The angle sensor of claim 12 further comprising:
a bearing ring, wherein the bearing ring is connected to the shaft and includes two bearing seats;
wherein the other two of the bearing extensions of the transmission element lying opposite to one another engage respectively with the two bearing seats of the bearing ring.

14. The angle sensor of claim 1 wherein:
the measuring gear includes a magnet whose angular position is determined by a magnetic field sensor fixed in place.

15. The angle sensor of claim 1 further comprising:
a second measuring gear driven directly or indirectly by the drive gear;
wherein the angular position of the shaft is detected over more than a full revolution from the angular positions of the two measuring gears.

16. The angle sensor of claim 1 wherein:
the angle sensor is a steering angle sensor in a vehicle and the shaft is a steering spindle.

17. An angle sensor for sensing angular position of a rotatable shaft, the angle sensor comprising:
a drive gear connected to the shaft, the drive gear including a support element;
a measuring gear driven by the drive gear, wherein an angular position of the measuring gear is indicative of the angular position;
a sensor housing having a bearing for the drive gear;
wherein the drive gear is rotationally movable along the bearing about an axis of rotation radially inward from the bearing; and
at least one spring arranged between the bearing and the support element of the drive gear to forcibly press the support element radially inward from the bearing toward the axis of rotation of the drive gear and thereby bias the drive gear toward the axis of rotation of the drive gear.

18. The angle sensor of claim 17 wherein:
one of the at least one spring is arranged between the bearing and the support element of the drive gear radially opposite the measuring gear.

19. The angle sensor of claim 17 wherein:
the bearing is an annular-shaped recess of the sensor housing.

20. The angle sensor of claim 19 wherein:
each spring is held in a pair of axial slots of the annular-shaped recess of the sensor housing.

* * * * *